United States Patent [19]
Wang et al.

[11] Patent Number: 5,940,039
[45] Date of Patent: Aug. 17, 1999

[54] HAND-HELD COMMUNICATION EQUIPMENT WITH A RADIATION SHIELDING ANTENNA APPARATUS

[76] Inventors: Lei A. Wang; Wei Wang, both of 50 Fengsheng Hutong, Xicheng, Beijing, China, 100032

[21] Appl. No.: 08/894,169
[22] PCT Filed: Jan. 26, 1996
[86] PCT No.: PCT/CN96/00007
§ 371 Date: Nov. 17, 1997
§ 102(e) Date: Nov. 17, 1997
[87] PCT Pub. No.: WO96/23327
PCT Pub. Date: Aug. 1, 1996

[30] Foreign Application Priority Data

Jan. 28, 1995 [CN] China .......................... CN 95 1 00160

[51] Int. Cl.⁶ ...................................... H01Q 1/24
[52] U.S. Cl. ............................ 343/702; 343/841; 455/89; 455/90
[58] Field of Search ..................... 343/702, 841, 343/745, 749; 455/89, 90; H01Q 1/24

[56] References Cited

U.S. PATENT DOCUMENTS

| | | | |
|---|---|---|---|
| 5,214,434 | 5/1993 | Hsu ........................................... | 343/702 |
| 5,335,366 | 8/1994 | Daniels ..................................... | 455/89 |
| 5,336,896 | 8/1994 | Katz ......................................... | 250/515 |
| 5,590,416 | 12/1996 | Rydbeck .................................. | 455/90 |
| 5,613,224 | 3/1997 | Auvray ..................................... | 455/89 |
| 5,646,635 | 7/1997 | Cockson et al. ......................... | 343/702 |
| 5,826,201 | 10/1998 | Gratias .................................... | 455/575 |

FOREIGN PATENT DOCUMENTS

| | | |
|---|---|---|
| CN 2185928 | 12/1994 | China . |
| 0 508 299 A1 | 10/1992 | European Pat. Off. . |
| 0 508 299 B1 | 10/1992 | European Pat. Off. . |
| 0 588 365 A1 | 3/1994 | European Pat. Off. . |
| 0 675 562 A1 | 10/1995 | European Pat. Off. . |
| 0 689 297 A1 | 12/1995 | European Pat. Off. . |
| 0 689 297 B1 | 12/1995 | European Pat. Off. . |
| WO 94/21053 | 9/1994 | WIPO . |

*Primary Examiner*—Hoanganh Le
*Assistant Examiner*—Shih-Chao Chen
*Attorney, Agent, or Firm*—Pennie & Edmonds LLP

[57] ABSTRACT

A hand-held communication equipment with a radiation shielding antenna apparatus is provided. It comprises a hand-held main body and an antenna apparatus, characterized in that said antenna apparatus comprises an antenna rod and an antenna pedestal, wherein an inductive coil, an inductive coil fixing frame and a radiation shielding case are fixed in said pedestal; the lower end of the antenna rod has a globe joint; there is a plate spring at the upper end of the inductive coil pressing tightly against said antenna rod serving as the signal source of the antenna; there is a plug on the bottom of the fixing frame designed to fit in with an antenna socket in the hand-held main body for plugging the antenna apparatus into the main body; said radiation shielding case encases the inductive coil for producing the capacitance between said shielding case and said inductive coil, thereby changing the polarizing mode of the antenna; in the working state, the antenna rod tilts toward the backside of the hand-held communication equipment main body, so as to change the polarizing mode of the antenna into a dual foliar polarizing mode, thus enabling the head part of the user to be in the radiation safe area generated by the new polarizing mode.

3 Claims, 5 Drawing Sheets

HAND-HELD COMMUNICATION EQUIPMENT WITH A RADIATION SHIELDING ANTENNA APPARATUS

TECHNICAL FIELD

This invention relates to a hand-held communication equipment with a radiation shielding antenna apparatus, and in particular, relates to altering the direction of a vertical antenna of the hand-held communication equipment, such as hand-held telephone, interphone and cordless telephone, etc., by tilting it toward a direction away from human body and to the horizontal direction (i.e., letting the antenna tilt backward to the backside of the hand-held telephone's main body), so that the user's head is in a safe area formed in the new polarizing mode, thereby damping the electromagnetic radiation to the user's head part below the safety standard.

BACKGROUND ART

At present, hand-held communication equipment has become more and more popular for its advantages such as free from the restriction of telephone line, handy portability and rapid connection. However, the radiation pollution brought by the hand-held communication equipment to the user shall not be ignored. Take a hand-held telephone set for example, when the user is having a call, the sound wave is converted into high-frequency electromagnetic wave by the hand-held telephone so as to send out electric signal. At the same time, relatively intensive high-frequency microwave radiation will occur in the surrounding space of the handset antenna. If the user's head part is exposed to such intense high frequency microwave radiation for long durations frequently, an injury to the user's head may be caused and result in pathological changes.

FIG. 1 is a diagram of electromagnetic radiation pattern of a conventional hand-held telephone antenna, which is used as an example to illustrate the radiation pollution of a hand-held telephone overshadowing the user's head.

The existing hand-held telephone antenna are usually divided into the following types: the ordinary rod type antenna, which is generally used in the communication equipment with microwave band with relatively shorter wavelength; inductively-loaded rod type antenna, which can be used in the communication equipment with relatively wider frequency band in which the length of the antenna is limited by the inductance for the purpose of shortening the antenna length so that it can be carried conveniently; pure inductance type antenna, used in mini and micro communication equipment, in which the antenna is minimized mainly for easy carrying; magnetic induction type antenna, used in single-section telescopic type hand-set, featuring a structure which is easy to carry and handy to use.

The electromagnetic waves transmitted by the above four types of antennae emit all around, as shown in FIG. 1, therefore the microwave radiation to the user will occur. Under the condition of the same power, the shorter the antenna is, the greater the transmitted power density will be, and consequently the severer the radiation to the user's head part will be. As it is specified explicitly in the safety and hygienic standards of environmental electromagnetic wave radiation published by the Health Ministry of the People's Republic of China that 40 mW/cm$^2$ is the second-grade safety standard, the value exceeding this standard will have harmful influence on human body. Take the hand-held telephone for example, according to the test conducted by the China National Metrological Institute, when the transmitted power is 0.6 w, the electromagnetic power density around the antenna is 1100 to 2800 mW/cm$^2$.

DISCLOSURE OF THE PRESENT INVENTION

The purpose of the present invention is to provide a hand-held communication equipment with a radiation shielding antenna apparatus to overcome the above defects in the prior art. When using the communication equipment with a radiation shielding antenna apparatus of the present invention, the head part of the user is in a safe area formed by the new polarizing mode so that the electromagnetic radiation sustained by the user's head will be minimized to attain the safety standards established by the Health Ministry of the People's Republic of China.

The purpose of the present invention is achieved as follows: the hand-held communication equipment with a radiation shielding antenna apparatus of the present invention comprises a hand-held main body of the communication equipment and an antenna apparatus, in which said antenna apparatus comprises an antenna rod and a radiation shielding case disposed at the base portion of the antenna. When the user makes use of said hand-held communication equipment, said antenna rod shall be tilted toward the backside of the main body of the hand-held communication equipment, with the angle between the antenna rod and the main body being $0°<\theta<90°$, preferably $45°<\theta90°$, and most preferably $\theta=90°$, thus, by means of changing the position of the antenna relative to the main body, and by the capacitance produced between the radiation shielding case and the inductive coil within the antenna apparatus, the polarizing mode of the antenna is changed into a dual-foliar polarizing mode, thus, a safe area is formed in the position around the user's head part, thereby minimizing the radiation to the user's head part

EMBODIMENT OF THE PRESENT INVENTION

In order to describe clearly the structure and principle of the antenna apparatus of the invention, Motorola 9900 hand-held telephone is taken for example, however, it is apparent to those skilled in the art that the structure and principle of the present invention can also be applied to other types of hand-held communication equipment.

Figure 1:
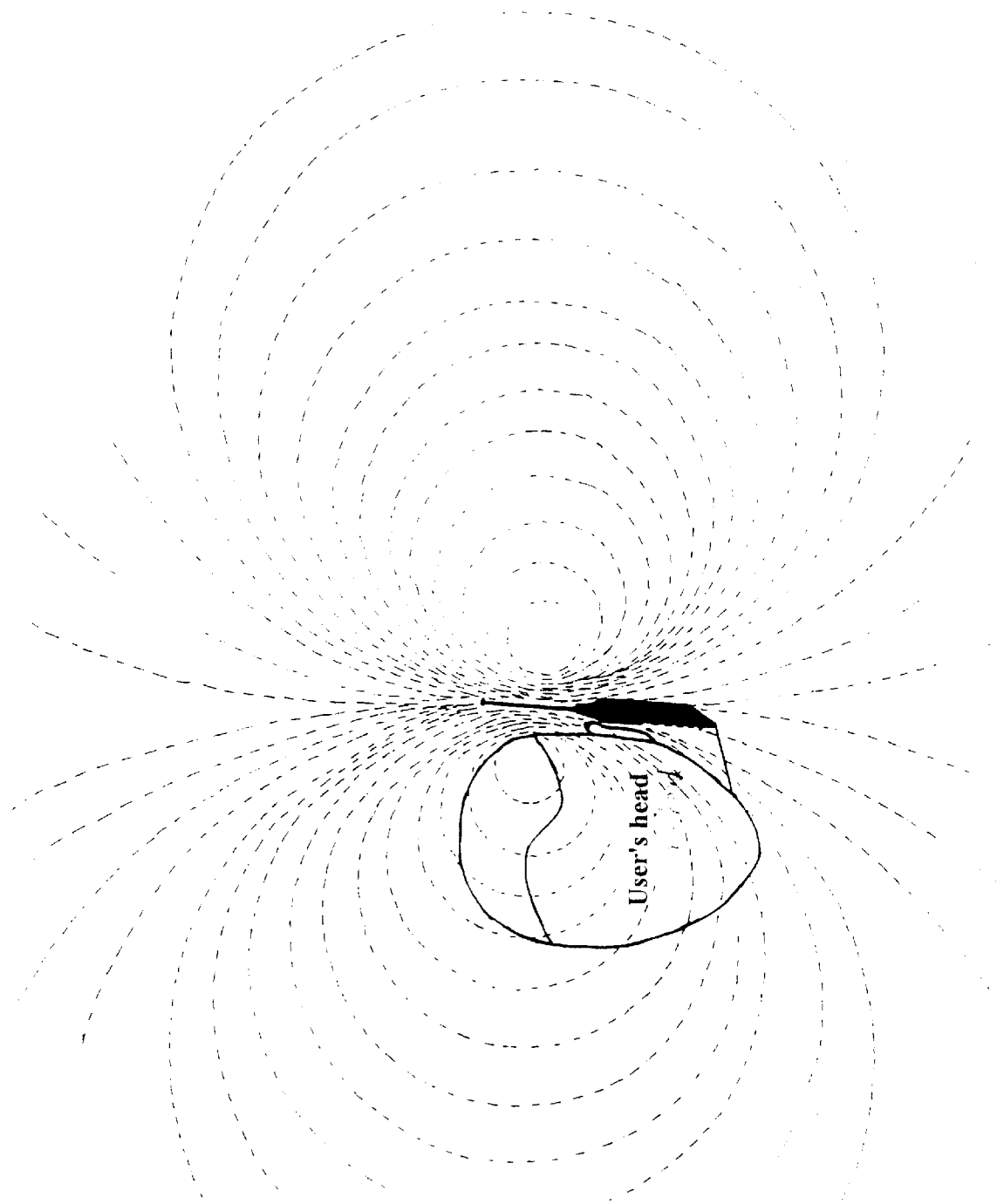
FIG. 1 is a diagram of the antenna polarizing mode when a conventional hand-held telephone is in use.
Figure 2A:
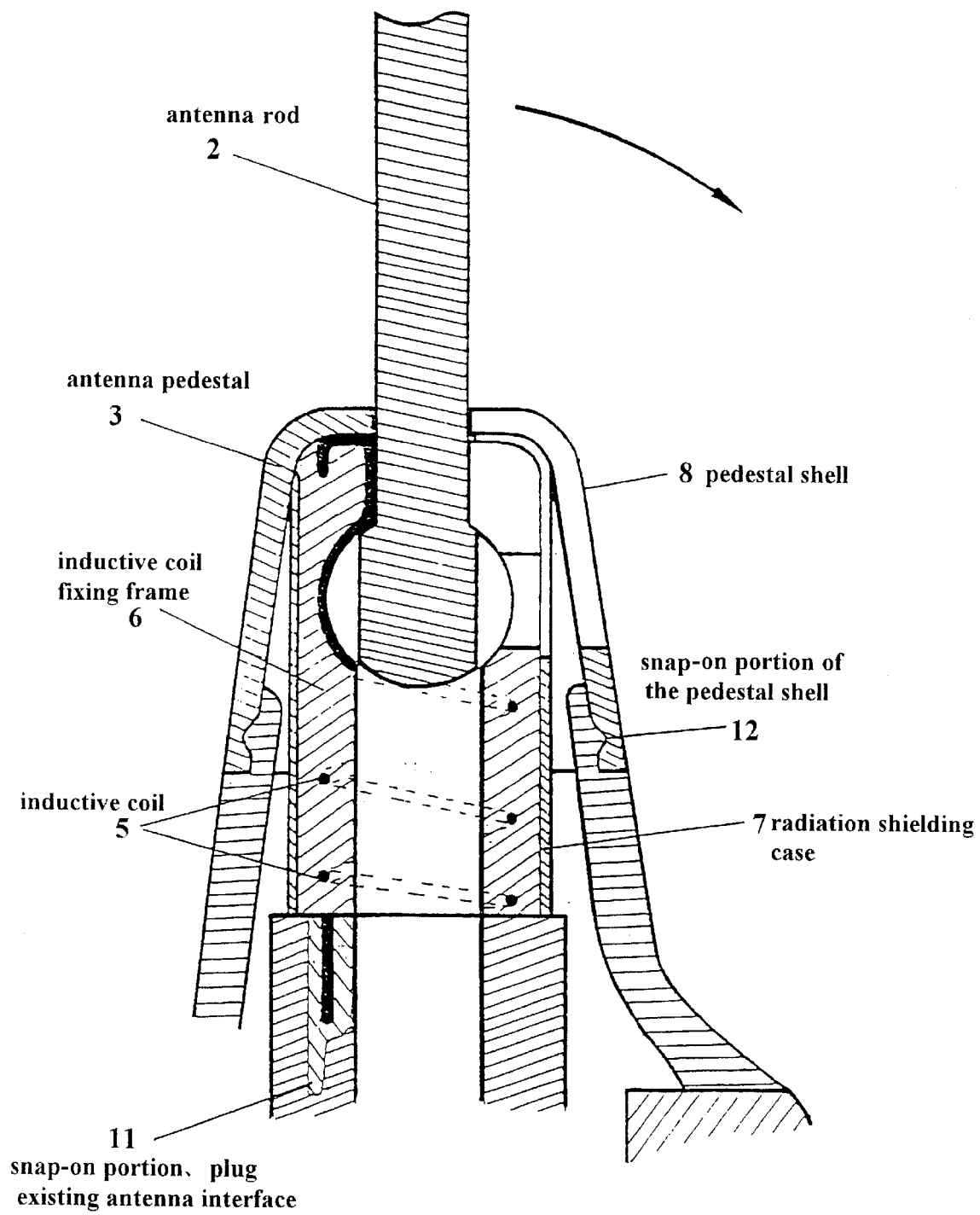
FIG. 2 shows the structure of the antenna apparatus of the present invention.
Figure 2B:
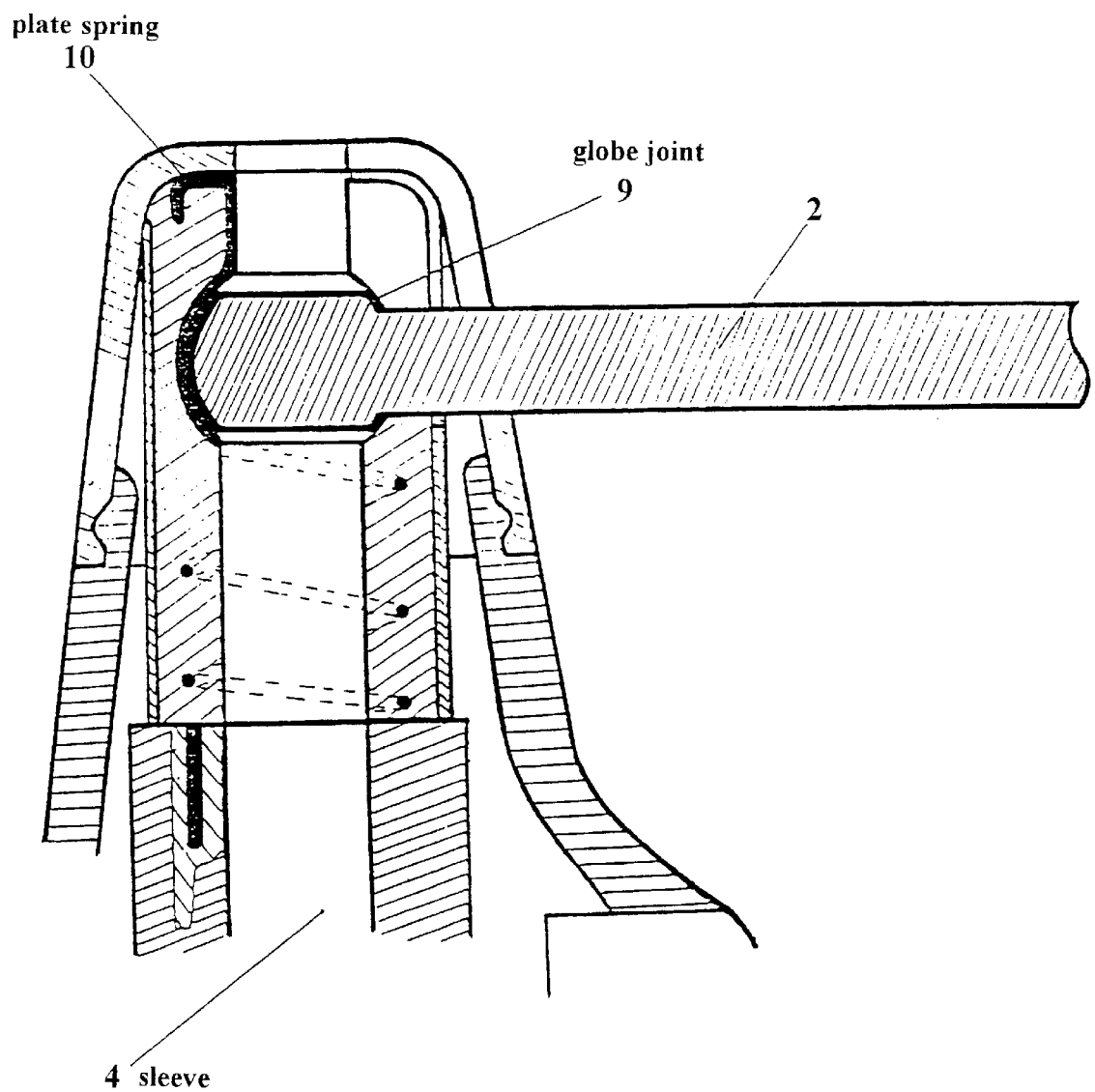
Figure 3:
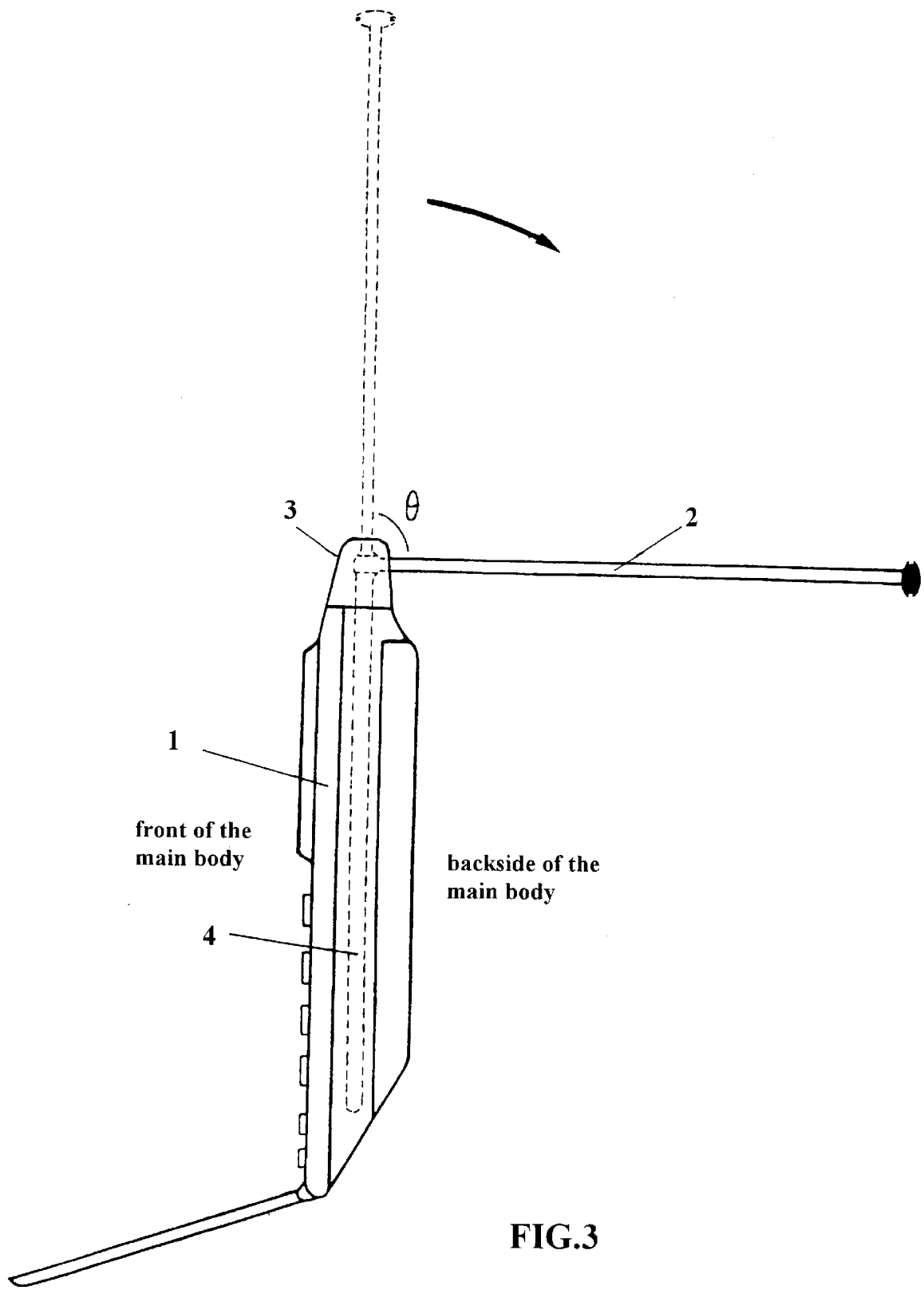
FIG. 3 shows the hand-held telephone of the present invention in a working state.

FIG. 2A and 2B are detailed illustrations of the structure of the antenna apparatus of the present invention, and FIG. 3 is a hand-held telephone equipped with the antenna apparatus of the present invention, FIG. 2A shows the antenna in a vertical position, and FIG. 2B illustrates that the antenna is perpendicular to the main body when the hand-held equipment is in a working state. The antenna apparatus of the present invention comprises an antenna rod 2 and an antenna pedestal 3. An inductive coil 5, an inductive-coil fixing frame 6, a radiation shielding case 7 and a pedestal shell 8 are fixed on the pedestal 3. The lower end of the antenna rod may have a globe joint 9 or the like so that the antenna rod 2 can tilt toward the backside of the main body after being pulled out completely from the sleeve 4 in the telephone main body 1, until it is perpendicular to the main body. There is a plate spring 10 at the upper end of the inductive coil 5 pressing tightly against the antenna rod 2 to serve as a signal source of the antenna. The coil 5 is molded inside of the inductive coil fixing frame 6. There is a plug 11 on the bottom of the fixing frame 6, designed to fit in with the antenna socket of the hand-held telephone 1 for plugging the antenna apparatus into the main body. The radiation shielding case 7 made of a metallic material is grounded and covers the inductive coil fixing frame 6 for producing shielding effect to prevent the electromagnetism in the inductance from leaking, and achieving a change in the electromagnetic polarizing mode through the capacitance produced between the radiation shielding case 7 and the inductive coil 5, so as to damp the electromagnetic field around the hand-held telephone earphone, thereby enabling the effective power to act on the antenna rod 2. The coil 5, fixing frame 6 and radiation shielding case 7, etc. are encased completely in the pedestal shell 8. Said pedestal shell 8 has a notch open toward the backside of the main body, with the width of said notch being equal to the diameter of the antenna for fixing the orientation of the antenna so that the antenna can not swing in the horizontal direction when it is perpendicular to the main body.

When the user wants to use the hand-held communication equipment of the present invention, he only needs to insert the plug 11 on the bottom of the inductive-coil fixing frame 6 into the antenna socket of the handset with the notch of the antenna pedestal shell open toward the backside of the main body, and press the snap-on portion 12 of the antenna pedestal shell onto the corresponding portion of the handset shell. When the antenna is inserted completely into the antenna sleeve 4 in the handset, the handset is in a receiving state. If the user needs to make a call, the antenna rod 2 shall be pulled out completely from the sleeve 4, as shown in FIG. 3, and tilted toward the backside of the main body, preferably until it is perpendicular to the main body.

Figure 4:
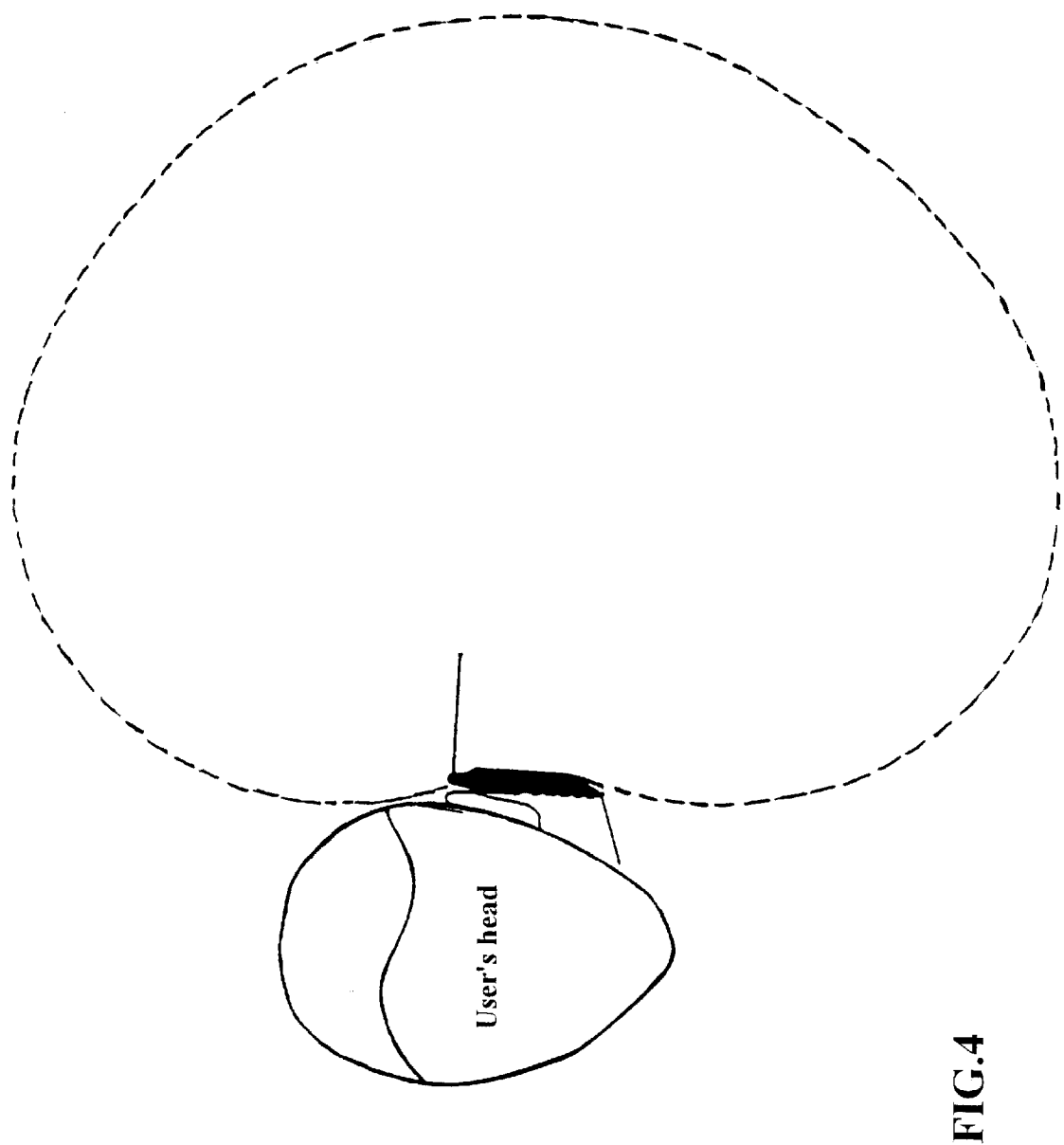
FIG. 4 is a diagram illustrating the principle of polarizing mode of the antenna apparatus of the present invention.

The polarizing mode of the antenna apparatus of the present invention and the principle of damping the radiation to the head part of the user will be illustrated as follows with reference to FIGS. 2, 3 and 4.

The basic principle of the present invention is to change the polarizing mode of the antenna for a new polarizing mode, i.e., to shift the direction of a vertical antenna by letting it tilt toward the backside of the main body or be perpendicular to the main body and in combination with the arrangement of a radiation shielding case mounted at the base portion of the antenna to get the radiation intensity of the communication equipment antenna to be different in different directions, and to form a weak field strength area in a certain region, which is called a safe area. In this safe area the purpose of radiation shielding can be attained by diverting the strong field away from the position of the user's head part; that is, by means of changing the relevant position of the antenna and incorporating the principle of electromagnetic shielding, the user's head part can be protected from strong electromagnetic wave radiation in a relevant position. As shown in FIG. 4, the matched inductance of the antenna pedestal is shielded with a grounded metal shell to prevent the electromagnetic wave from leaking and endangering the safety of the user's head part, thus, in addition to changing the electromagnetic direction of the antenna(as shown in the figures), a reasonable impedance matching can be achieved by the capacitance generated between the radiation shielding case and the inductance to produce a safe area in the earphone position near the head part and attain the purpose of radiation shielding.

Although a preferred embodiment of the present inventions is disclosed in connection with an example, it should be understood by those skilled in the art that it is possible for various modifications, substitutions and supplements within the scope of claims and the principle of the present invention.

We claim:

1. A hand-held communication equipment with a radiation shielding antenna apparatus, comprising a hand-held main body and an antenna apparatus, characterized in that said antenna apparatus comprises an antenna rod and an antenna pedestal, wherein an inductive coil, an inductive coil fixing frame and a radiation shielding case are fixed in said pedestal; the lower end of the antenna rod has a globe joint; there is a plate spring (101 at the upper end of the inductive coil pressing tightly against said antenna rod serving as the signal source of the antenna; there is a plug on the bottom of the fixing frame designed to fit in with an antenna socket in the hand-held main body for plugging the antenna apparatus into the main body; said radiation shielding case encases the inductive coil for producing the capacitance between said shielding case and said inductive coil, thereby changing the polarizing mode of the antenna; in the working state, the antenna rod tilts toward the backside of the handheld communication equipment main body, so as to change the polarizing mode of the antenna into a dual foliar polarizing mode, thus enabling the head part of the user to be in the radiation safe area generated by the new polarizing mode.

2. The hand-held communication equipment with a radiation shielding antenna apparatus according to claim 1, characterized in that the angle between the antenna rod and the main body is $0° < \theta < 90°$.

3. The hand-held communication equipment with a radiation shielding antenna apparatus according to claim, characterized in that the angle between the antenna rod and the main body is $\theta = 90°$.

* * * * *